US005916402A

United States Patent [19]
Takano et al.

[11] Patent Number: 5,916,402
[45] Date of Patent: Jun. 29, 1999

[54] METHOD FOR MANUFACTURING OPTICAL ELEMENT

[75] Inventors: Toshihiko Takano; Michio Ohba; Hisashi Ohwada; Yasunari Kawabata, all of Tokyo, Japan

[73] Assignee: Mitsubishi Gas Chemical Company, Inc., Japan

[21] Appl. No.: 08/803,368

[22] Filed: Feb. 20, 1997

[30] Foreign Application Priority Data

| Feb. 21, 1996 | [JP] | Japan | 8-033705 |
| Jun. 11, 1996 | [JP] | Japan | 8-149289 |
| Jul. 26, 1996 | [JP] | Japan | 8-197736 |

[51] Int. Cl.$^6$ ............................. B32B 31/00; B29D 11/00
[52] U.S. Cl. ....................... 156/242; 156/257; 156/275.5; 264/1.1; 264/1.24; 264/1.34; 264/494; 427/264; 385/129; 385/130
[58] Field of Search .................................. 264/1.24, 1.34, 264/138, 157, 494, 496, 1.1; 156/242, 250, 257, 275.5; 427/264; 385/130, 129

[56] References Cited

U.S. PATENT DOCUMENTS

| 3,917,766 | 11/1975 | Howden . |
| 4,235,654 | 11/1980 | Dohi et al. . |
| 4,863,540 | 9/1989 | Catalano et al. . |
| 5,288,221 | 2/1994 | Stoerr et al. . |
| 5,400,182 | 3/1995 | Chiba . |
| 5,543,228 | 8/1996 | Taniguchi et al. . |
| 5,717,532 | 2/1998 | Chiba et al. . |

FOREIGN PATENT DOCUMENTS

| 0 217 502 | 4/1987 | European Pat. Off. . |
| 0 357 396 | 3/1990 | European Pat. Off. . |
| 0 426 441 | 5/1991 | European Pat. Off. . |
| 0 575 885 | 12/1993 | European Pat. Off. . |
| 56-3522 | 1/1981 | Japan . |
| 63-89343 | 4/1988 | Japan . |
| 3-156407 | 7/1991 | Japan . |
| 4-317435 | 11/1992 | Japan . |
| 6-308301 | 11/1994 | Japan . |
| 7-49419 | 2/1995 | Japan . |
| 9-2841 | 1/1997 | Japan . |
| WO 93/21010 | 10/1993 | WIPO . |

*Primary Examiner*—Curtis Mayes
*Attorney, Agent, or Firm*—Sterne, Kessler, Goldstein & Fox, P.L.L.C.

[57] ABSTRACT

An object of the present invention is to allow an optical element to be obtained with good precision using a polymer film and a glass substrate as a reinforcer. The present invention is characterized by the fact that a polymer film is formed on a glass substrate which has been treated to prevent the glass substrate and polymer from separation. This allows an optical circuit pattern to be formed without producing separation between the glass substrate and polymer film when the film is formed. The dimensional precision of the configuration of the distributed index in the polymer film can be maintained generally to the same extent as the expansion and shrinkage of the glass substrate. In addition, a vessel obtained with a glass substrate as the bottom surface can be used as the casting vessel.

7 Claims, 3 Drawing Sheets

METHOD FOR MANUFACTURING OPTICAL ELEMENT

BACKGROUND OF THE INVENTION

1. Field of the Invention

The present invention relates to a method for manufacturing an optical element comprising an optical element in the form of a polymer flat sheet (hereinafter referred to as polymer film), which is used as an optical component such as an optical branch coupler, optical transceiver module, spatial light modulator, and microlens array, and more particularly to an optical element which can be easily mass produced at a low cost and with high dimensional precision as an optical waveguide having a distributed index in a polymer in the form of a flat sheet, and as an optical element involving the use of a series of polymers having an optical phase controlling or optical path controlling function.

2. Description of the Related Art

Optical elements and optical components, such as optical branch couplers, optical transceiver modules, spatial light modulators, and microlens arrays, have rapidly come to enjoy wide use in a wide range of fields involving the use of light, such as the data communications, data processing, and imaging fields. Their increasing use in these fields has led to greater demand for higher performance and lower costs.

Optical elements involving the use of polymer film have excellent properties, such as their simple manufacture, inexpensive starting materials, broad application in the form of films, and inexpensive manufacturing equipment. Some drawbacks, however, are that shrinkage caused by solvent extraction during the manufacture of polymer films results in poor dimensional precision, with substantial differences in the thermal expansion coefficient between inorganic compounds.

A method referred to as selective photopolymerization has been disclosed in Japanese Patent Publication 56-3522 as a method for manufacturing optical elements using polymer film. This is a method in which a distributed index is formed inside the film. A specific manufacturing method has been disclosed in Japanese Patent Laid-Open Publication 3-156407.

In this method, a polycarbonate resin obtained using bisphenol Z as the starting material is used as a transparent polymer, and a vinyl monomer such as methyl acrylate is used as a photopolymerizable monomer, so as to manufacture a film consisting of a polycarbonate Z containing a photopolymerizable monomer. Desired portions of the film are then exposed to polymerize and fix these portions, and the unreacted monomer is dried away. The aforementioned step results in portions with differing refractivities (the exposed portions contain acrylic resin, resulting in a lower refractivity).

The specific manufacturing steps for obtaining an optical element using a polymer film comprise the following series of steps.

Step 1: A transparent polymer film containing a photopolymerizable monomer is manufactured by solvent casting in a container.

Step 2: Desired portions of the polymer film obtained in Step 1 are irradiated with ultraviolet rays to polymerize and fix the photopolymerizable monomer in the exposed portions.

Step 3: The exposed polymer film is separated and dried, and the unreacted photopolymerizable monomer is removed to form a distributed index.

Step 4: The dried polymer film is allowed to adhere to a glass substrate.

Step 5: Subsequent processing results in the desired optical element.

The steps are described in greater detail below.

The solvent casting method is employed in Step 1 because the film is simple to manufacture, the film thickness can be readily controlled, and the concentration of the photopolymerizable monomer is readily controlled, allowing desired differences in refractivity to be obtained.

The film is manufactured in this method by allowing a polymer solution to flow into a flat-bottomed container, and evaporating the solvent off as the solvent vapor pressure is controlled. There is a minimum concentration for the matrix resin and the photopolymerizable monomer used to obtain a distributed index by photopolymerization in the polymer solution used here. The solution may also contain a sensitizer in the form of a photopolymerization promoter as needed. A highly transparent polycarbonate resin and an acrylic-based monomer are frequently used as the matrix polymer and photopolymerizable monomer material, respectively.

The film thickness is controlled by the ratio between the container floor surface area and the amount of solution, and by the concentration of the solution.

The film thickness distribution is also adjusted by the horizontality and flatness of the container and the solvent drying conditions.

A polymer film containing a suitable amount of photopolymerizable monomer is obtained by these operations. After the solvent has been sufficiently evaporated off, the polymer film can be readily separated from the container whenever necessary.

In Step 2, the film that has been obtained in Step 1 is exposed to ultraviolet rays after a photomask having a light-blocking pattern has been placed on the film. This allows the photopolymerizable monomer in the film to be polymerized by the ultraviolet light rays and thus fixed in the film.

In Step 3, the polymer film is then separated from the container, the film is dried, and the unreacted photopolymerizable monomer in the matrix is removed. Here, in conventional cases, the film is removed during drying when the polymer film is dried without being removed from the container.

As a result of this drying, the film dimensions shrink about 2 to 4% because of the evaporation of the unreacted photopolymerizable monomer or residual solvent in the film. If the film is of a uniform thickness, the shrinkage is entirely uniform. The shrinkage is not uniform, however, if the film thickness is not uniform, resulting in warpage. Although the rate of shrinkage can be predicted to a certain extent, it is difficult to prevent dimensional error of about 10 $\mu$m per centimeter.

In Step 4, the distributed index polymer film manufactured in the above steps is allowed to adhere on a resin sheet or glass plate serving as the base.

In Step 5, the target optical element is manufactured by subsequent processes in which the film is cut to the necessary size and is combined as needed with other materials or the like.

The problem of dimensional precision due to the aforementioned shrinkage is a major problem in the manufacturing process.

The precision of recent optical products has improved considerably, and it is now easier to align optical axes, which used to be a factor in the greater costs in the past because of the troubles involved. In image-managing fields involving spatial light modulators and microlens arrays, increases in surface area have led to demand for location precision with display photoreception elements.

Conventional methods for manufacturing polymer films were simple, and a certain degree of precision was easy to obtain, depending on the solvent concentration, drying method, and the like. However, their precision is inadequate compared to the precision now demanded of the recent optical components described above. That is because of the poor dimensional precision and poor reproducibility of the pattern that is obtained owing to the shrinkage that occurs when the film is dried.

Although the rate of shrinkage can be predicted and controlled to a certain extent by controlling the drying conditions and the concentration of the photopolymerizable monomer, it is difficult to control the dimensions to within 10 μm per centimeter.

Although it is necessary to adjust the polymer and photopolymerizable monomer concentrations to address the extent of the variation in refractivity and thickness of the film that is manufactured, the need for manufacturing separate masks because of changes in the rate of shrinkage in such cases is an inconvenience.

When the film is no more than 20 μm, allowing the film to adhere to the base after drying makes handling difficult, it is difficult to have it adhere with good precision, and it is difficult to ensure the location precision of the element that is obtained.

For these reasons, it is no easy feat to form a pattern with high precision on a polymer film, and to obtain an optical element while retaining that precision.

In addition, because of the substantial thermal expansion coefficient of polymer films, the usable temperature range is sometimes limited in many applications requiring dimensional precision.

Optical elements obtained using polymer films have the advantages of inexpensive material costs and ease of manufacturing. However, because of the difficulties in ensuring precision, it has been difficult to lower the costs of devices as a result of the trouble involved in alignment, poor yields, and the like.

SUMMARY OF THE INVENTION

An object of the invention is to provide a method wherein shrinkage produced at the time of drying during the manufacture of a polymer film is suppressed, the deterioration in dimensional precision as a result of thermal expansion or shrinkage of the polymer film is controlled, and an optical element is manufactured simply and with good precision using the polymer film.

The inventors found that a polymer film can be formed on a glass substrate which has been treated to prevent separation between the glass substrate and the polymer as a method for the high precision manufacture of an optical element using a polymer film in which the glass substrate serves as a reinforcer. As a result, an optical circuit pattern can be formed without causing separation between the glass substrate and polymer film when the film is formed, the dimensional precision of the configuration of the distributed index in the polymer film can be maintained generally to the same extent as the expansion and shrinkage of the glass substrate, and a vessel obtained with the aforementioned glass substrate as the bottom surface can be used as the casting vessel.

That is, the present invention is intended to provide a method for manufacturing an optical element, comprising: a first step, in which a transparent polymer film containing a photopolymerizable monomer is manufactured by solvent casting; a second step, in which said transparent polymer film is selectively irradiated with ultraviolet rays to polymerize and fix the photopolymerizable monomer in the areas exposed to this light; a third step, in which the polymer film obtained in said second step is dried, and the unreacted photopolymerizable monomer is removed to form a distributed index polymer film; a fourth step, in which said distributed index polymer film is allowed to adhere to a glass substrate; and a fifth step, in which subsequent processing is conducted, characterized in that said glass substrate (I) is treated to prevent separation of the transparent polymer from said glass substrate, said transparent polymer of said first step is manufactured on the glass substrate (I), and the exposure of said second step, the drying of said third step and the subsequent processing of said fifth step are conducted without separating the polymer film from the glass substrate (I).

Said transparent polymer is a polycarbonate resin obtained from 1,1-bis(4-hydroxyphenyl)cyclohexanone as the starting material, and said photopolymerizable monomer is an acrylic acid ester-based monomer.

A surface of said glass substrate (I) is treated with an organosilane compound for improving the the affinity between the glass and the transparent polymer.

Said organosilane compound is $Si(R^1)(OR^2)_3$ (where $R^1$ is an organic group having a vinyl bond or an amino group, and $R^2$ is a methyl or ethyl group).

Said glass substrate (I) has a groove formed around the area in which an optical element is to be formed.

Said groove is within the following range:
0.2 mm$\leq$W$\leq$1 mm, and
0.3 mm$\leq$D$\leq$1 mm,
where W is the groove width, and D is the groove depth.

The present invention is also intended to offer a method for manufacturing an optical element, comprising: a first step, in which a transparent polymer film containing a photopolymerizable monomer is manufactured by solvent casting; a second step, in which said transparent polymer film is selectively irradiated with ultraviolet rays to polymerize and fix the photopolymerizable monomer in the areas exposed to this light; a third step, in which the polymer film obtained in said second step is dried, and the unreacted photopolymerizable monomer is removed to form a distributed index polymer film; a fourth step, in which said distributed index polymer film is allowed to adhere to a glass substrate; and a fifth step, in which subsequent processing is conducted, characterized in that said transparent polymer film of said first step is manufactured in said casting vessel which is equipped with a glass substrate (A), a packing material (B) located on the edge of said glass substrate (A), and a frame (C) arranged in the form of said packing material is manufactured, and the exposure of said second step, the drying of said third step and the subsequent processing of said fifth step are conducted without separating the polymer film from the glass substrate (A).

Said packing material (B) is a cellulose-based material.

DETAILED DESCRIPTION OF THE INVENTION

The structure of the present invention is described in detail below.

When the exposure component involves the use primarily of the short wave region from visible light to near infrared light, the polymer material used to manufacture the distributed index polymer film in the present invention is, in general, preferably a polycarbonate resin or an acrylic resin because of the low loss of light with materials having a high transmission with respect to light in the short wave region, that is, materials having low photo-absorption.

Combinations of polycarbonate resins obtained as the base resin from bisphenol Z (=1,1-bis(4-hydroxyphenyl) cyclohexanone) and acrylic acid ester-based photopolymerizable monomers can be particularly suitable for use. Specific examples of acrylic acid esters include methyl acrylate, ethyl acrylate, and trifluoroethyl acrylate.

The polymer solution used in the solvent casting method of the present invention involves adjusting the base resin and photopolymerizable monomer concentrations according to the thickness of the film that is manufactured, the suitable amount in which the photopolymerizable monomer is blended, and the method for spreading the solvent. A sensitizer may also be added as needed to promote photopolymerization. The type of solvent that is selected should dissolve the resin that is used and should have a boiling point sufficiently lower than that of the photopolymerizable monomer.

The use of methylene chloride as the solvent is preferred, for example, when a polycarbonate resin obtained from bisphenol Z and an acrylic acid ester-based monomer are used. The base resin concentration should be adjusted to between about 5 and 15%, while that of the photopolymerizable monomer should be adjusted to between about 1 and 10%. Compounds that are well known as photopolymerization initiators, such as benzoin ethyl ether, are effectively blended in small amounts as sensitizers.

The glass substrate (I) in the present invention is ultimately the clad phase and may thus be any material with a refractivity sufficiently lower than that of the core phase in the polymer film, but glass substrates with a high degree of flatness precision that have been treated by lapping, policing, or the like are preferred in order to ensure a uniform film thickness and in order to ensure adhesion between the film and photomask during exposure.

The glass substrate of the present invention is obtained by treating the glass substrate to prevent it from separating from the transparent polymer. Specific examples include:

(1) treating the surface of the glass substrate using an organosilane compound having the effect of enhancing the affinity between the glass substrate and the transparent polymer;

(2) forming a groove around the portion in which the optical element is to be manufactured;

(3) protecting the portion in which the optical element is to be manufactured using a mask and scratching the portion uncovered with the mask using mechanical methods such as sandpaper or sand blast to make irregularities;

(4) protecting the portion in which the optical element is to be manufactured using a mask and treating the portion uncovered with the mask using chemicals such as sprays for ground glass to make irregularities; and (5) protecting the portion in which the optical element is to be manufactured using a mask, and depositing metal such as chrome on the portion uncovered with the mask and plating as desired, to make irregularities;

and moreover, the above mentioned (1) to (5) can be combined as desired. The above mentioned (1) and (2) are the most preferable uses which can be carried out easily and used as is. The former (1) can be used with the latter (2) as desired.

When a polycarbonate resin obtained from bisphenol Z is used as the base resin and an acrylic acid ester-based monomer is used as the photopolymerizable monomer in treatment (1) above, silane compounds having amino group-containing substituents have high affinity for said polycarbonate resin, and silane compounds having substituents that contain amino groups or vinyl bonds have high affinity for acrylic-based resins polymerized with photopolymerizable monomers. As such, $Si(R^1)(OR^2)_3$ (where $R^1$ is organic group having a vinyl bond or an amino group, and $R^2$ is a methyl or ethyl group) is preferred as an organosilane compound.

Specific examples include the compounds 3-aminopropyltriethoxysilane, 3-aminopropyltrimethoxysilane, N-(3-acryloxy-2-hydroxypropyl)-3-aminopropyltriethoxysilane, N-(2-aminoethyl)-3-aminopropyltrimethoxysilane, trimethoxysilylpropyldiethylenetriamine, and 3-methacryloxypropyltrimethoxysilane.

There are also various types of silane coupling agents. Any compound having the function of firmly fixing the polymer film and glass substrate may be used.

The aforementioned glass substrate surface improvers may be used individually or in combinations of several compounds. The surface of the glass substrate is improved by using the agent in a common manner, for example, by immersing the glass substrate in an approximately 1 to 2% silane coupling agent aqueous solution, followed by drying.

In treatment (2) above, the groove on the glass substrate is intended to allow the resin that fills in the groove during the manufacture of the polymer film to firmly adhere to the groove walls, so that the film and glass are prevented from separating from the zone on the inside of the groove, even when their separation is promoted at the edge of the glass substrate as a result of film shrinkage during drying following exposure.

Because of the possibility that separation from the edges may occur in any direction, a zone enclosed by the groove should be made and an optical circuit pattern should be formed in this zone in order to completely prevent separation of the component used to make the optical element.

The width and depth of the groove formed on the glass substrate are not particularly limited, as long as the adhesion strength is sufficient to prevent the glass substrate and polymer film from separating, and the groove can be easily processed.

As shown in the appended FIG. 3, examples of specific conditions for when the groove is formed around the entire zone in which the optical element is to be manufactured should be such that $0.2$ mm$\leq W \leq 1$ mm and $0.3$ mm$\leq D \leq 1$ mm, where W is the groove width and D is the groove depth.

When several small optical elements are to be formed on the same glass substrate, a groove can be formed in regions that do not compromise the optical properties around several optical elements, and in the case of large elements, a groove can be formed in regions that do not compromise the optical properties in blank areas where no distributed index is formed in the interior. In such cases, the groove may be of a lower width and depth than the aforementioned range.

A cutting machining tool or groove machining tool should be used as a device to machine the groove. Specific examples include dicing machines and slicing machines.

The groove should prevent separation in a highly reliable manner, with no substantial variation in adhesion as a result of the conditions for manufacturing the polymer film or the type of film.

The polymer film is manufactured by spreading the polymer solution on the glass substrate which has been thus treated to prevent separation.

Specific examples of methods for spreading the polymer solution on the glass substrate are methods that are most suitable depending on the thickness of the film that is manufactured and the viscosity of the solvent that is used, such as doctor blade methods, spin coating methods, dipping methods, and casting methods.

The method pertaining to the present invention can be used for a wide range of film thicknesses, from several $\mu$m to about 1 mm.

For example, when a thin film has a thickness of several $\mu$m, as in optical waveguides for single mode light, spin coating can be used to manufacture a film of uniform thickness.

A doctor blade or dipping method is effective when a film with a thickness in the tens of $\mu$m to about 300 $\mu$m is manufactured, as in multimode light optical waveguides, spatial light modulators, or chinoform panels.

When a film of around 1 mm is manufactured, as in thicker microlenses, a casting method can be used around the edges or the like, so as to keep the solution on the glass substrate.

Sufficiently firm adhesion can be brought about between the polymer film and the glass substrate by carefully and thoroughly spreading the solvent on the glass substrate.

The polymer film manufactured on the glass substrate is irradiated with ultraviolet rays by a common method, the photopolymerizable monomer is partially polymerized and fixed, and the unreacted photopolymerizable monomer and the residual solvent are then dried away to form a distributed index in the polymer film.

The preferred drying conditions vary depending on the composition of the polymer solution, but in cases involving the use of a polycarbonate resin obtained from bisphenol Z, an acrylic acid ester, and methylene chloride as the solvent, for example, the objectives can be achieved with vacuum drying for about 2 to 10 hours at a temperature ranging from 60 to about 110° C.

Subsequent processing results in the desired optical element. Prior to the subsequent processing, another layer of a glass substrate can be applied as needed using an adhesive or the like to the surface of the polymer film on the side not in contact with the glass substrate, so that glass substrates are on both sides of the film, allowing the polymer film to be more effectively prevented from separating from the glass substrate during the subsequent processing.

In the manufacturing method pertaining to the present invention, the light exposure is executed at room temperature, and the glass substrate, such as a glass substrate, has a low thermal expansion coefficient, so the resulting distributed index pattern is almost completely aligned with the mask pattern. In addition, the thermal expansion coefficient of the optical element is as it is with the polymer film adhering to the glass substrate, so it is virtually equivalent to that of the glass substrate, varying no more than 1 $\mu$m per 10 cm, despite changes in temperature of as much as 50° C. As a result, it is about as low as in materials having a relatively low thermal expansion coefficient, such as optical glass and light-related semiconductor elements, making it extremely suitable for use with other optical components. The element manufactured in the method of the present invention has precision that is at least 100 times greater than that obtained in conventional methods.

Due to the aforementioned advantages, large-scale elements with a width of about 5 to 30 cm, which were considered difficult for the purposes of dimensional precision in the past, as well as elements involving the use of extremely thin polymer films of about 5 to 20 $\mu$m thickness, which were difficult to keep on substrates while retaining their flat shape because the film was readily warped, can be readily manufactured by the present invention.

The method for manufacturing the optical element pertaining to the present invention described above can be more readily implemented by using a casting vessel constructed by laying on top of each other a glass substrate, packing material in the form of a frame, and a frame, in that sequence.

A method in which the casting is done with the glass substrate placed on the bottom of a conventional casting device can be considered in order to manufacture a cast film on the glass substrate. In such cases, however, the glass substrate clings to the casting vessel after the film has been manufactured, producing the inconvenience of having to take out the glass substrate, so a means for readily taking out the glass substrate is required.

These are described in detail with reference to figures.

FIG. 5 is an oblique view depicting an example of the structural materials of the casting vessel of the present invention, and FIG. 6 is of a casting vessel assembled using the parts in FIG. 5.

The numeral (A) in the figure is a glass substrate used as the glass substrate, (B) is a packing material in the form of a frame, and (C) is a frame. These are placed atop each other and are made closely contact to each other to form a vessel. The vessel can be used with this structure alone when it is of sufficient weight to prevent liquids from leaking through gaps in the packing material (B).

The example depicted in FIG. 5 is constructed with an additional platform (D) in the form of a frame on which the glass substrate (A) is placed. A plurality of screw setting holes (F) and (G) are provided in locations facing each other in the frame (C) and platform (D), and screws (H) can be used to firmly secure the series of structural components, ranging from the frame (C) to the platform (D). Because these can be used in the form of an integrated vessel, and because light materials can be used for the frame (C), they are easy to handle. Steps (E) may be provided to the platform (D) in the form of a frame to fashion a structure into which the glass substrate (A) is inserted. The size and thickness of the structural parts, the width of the frame, and so forth are not particularly limited and should be determined as needed depending on the target film.

The glass substrate (A) is not particularly limited as long as it has a high degree of flatness, although the use of those which have been treated to prevent separation as described above is particularly preferred.

The packing material (B) in the form of a frame is placed between the glass substrate (A) and the frame (C), and has the function of preventing leaks when the polymer solution is poured. As such, it must not produce leaks during use and must not by penetrated by the polymer solution that is used. It is important to select a material meeting these conditions.

Materials are limited when a highly dissolving solvent such as methylene chloride is used as the solvent for the polymer solution, because a material such as common silicone rubber or Viton is penetrated by the solvent and cannot be used. Examples of materials which can be used in such cases include cellulose-based materials such as paper, or Teflon-based materials.

Paper in particular is quite inexpensive and can be used most favorably. The specific type of paper is not limited as long as it is a cellulose-based paper, but since debris produced during use can contaminate the film and thus compromise the optical performance, cleaned paper such as dust-free paper used in clean rooms should be used.

The material for the frame (C) may by any material such as metal, glass, ceramic, or resin as long as it is not penetrated by the polymer solution. Light metals such as aluminum are ideal because of their ease of handling.

When the polymer film using the aforementioned casting vessel of the present invention is manufactured, the frame (C) and platform (D) in the form of a frame can be recovered and reused among the structural parts used for the casting vessel depicted in FIG. 5, for example, so at most only the glass substrate and packing material are consumed during the manufacture of each film.

The casting vessels used in the past had to have a bottom with a high degree of flatness and were thus expensive, whereas glass substrates with a high degree of flatness are inexpensively available, and inexpensive packing materials such as paper can be used, so casting vessels can be prepared at a low cost in mass production.

DESCRIPTION OF THE PREFERRED EMBODIMENTS

The method for manufacturing the optical element pertaining to the present invention is described in further detail below with reference to preferred embodiments. The following examples are only for the purpose of detailed description, and are not intended to limit the embodiments of the present invention or its scope.

EXAMPLE 1

Figure 1:
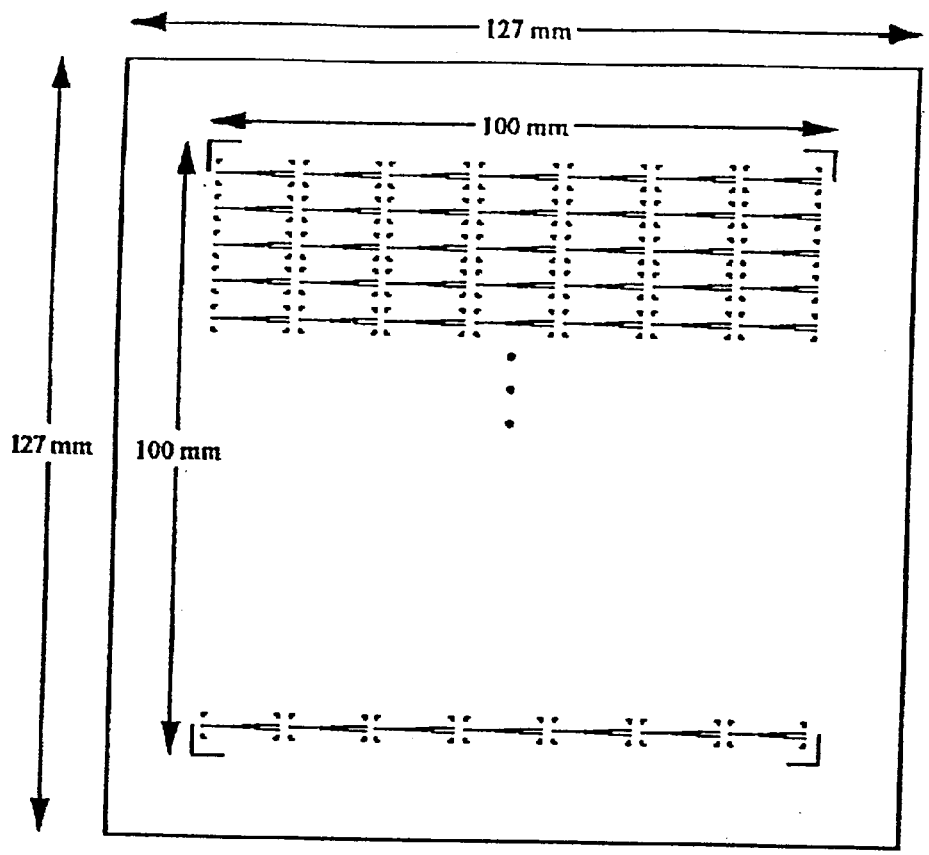
FIG. 1 is a plan of a photomask pattern used in a preferred Example of the present invention.

Manufacture of Bifurcated Optical Waveguide Element Having a 40 µm by 40 µm Square Cross Section A 127 mm by 127 mm square photomask having the pattern depicted in FIG. 1 was used.

Figure 2:
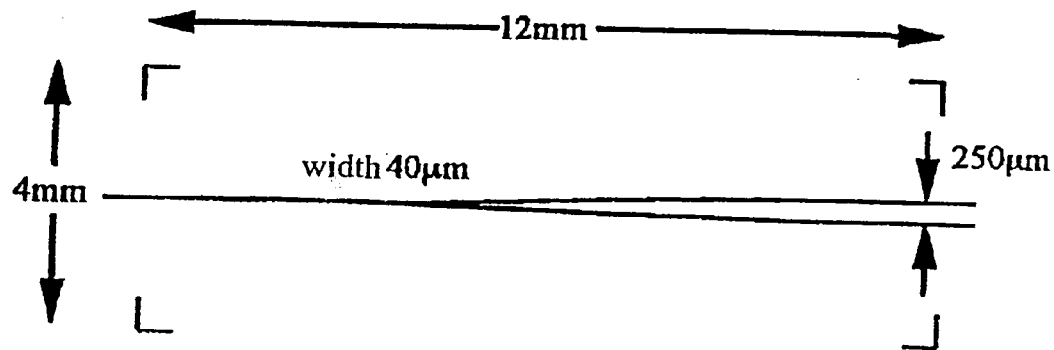
FIG. 2 is an enlarged plan of the optical waveguide pattern depicted in FIG. 1.

The photomask was obtained by forming the markings depicted in the figure into a 10 cm square including the waveguide pattern. The bifurcated waveguide pattern comprising an optical waveguide width of 40 µm and a branched waveguide pitch of 250 µm depicted in FIG. 2 was formed with the markings indicating those regions in said waveguide pattern region.

Glass substrates were used as the glass substrates in the embodiments given below.

A 15 cm and 1 mm thick glass plate was immersed for 2 minutes in a 2% 3-aminopropyltriethoxysilane aqueous solution, and was then dried for 1 hour in a 110° C. oven.

A solution was meanwhile prepared by dissolving a polycarbonate resin synthesized from bisphenol Z (trademark: IUPILON Z, mfg. by Mitsubishi Gas Chemical Company, Inc.), methyl acrylate as the photopolymerizable monomer, and benzoin ethyl ether as a sensitizer in the prescribed amount of methylene chloride, and the solution was applied with a doctor blade on the immersion-treated glass substrate. The glass substrate coated with the solution was then carefully dried to remove the solvent.

The aforementioned photomask was then placed on the film, which was irradiated with ultraviolet rays by a common method to polymerize the methyl acrylate monomer in the exposed portions.

The methyl acrylate in the unexposed portions was then vacuum dried away, resulting in a 40 µm thick polymer film consisting of a single polycarbonate phase (refractivity: 1.59) in the unexposed portions and a mixed phase of polycarbonate and polymethyl acrylate (refractivity: 1.56) in the exposed portions. The glass substrate and polymer film were firmly attached through the aforementioned steps.

The product was then cut to size of 12 mm×4 mm to obtain an optical waveguide element.

Before the product was cut into an optical waveguide element, the misregistration of the markings formed in the 10 cm by 10 cm square was measured. The branched waveguide pitch of the 12 mm×4 mm optical waveguide element thus manufactured was also measured.

The results revealed that the misregistration and pitch precision were both 1 µm or less.

The optical waveguide element underwent a heat cycle test 50 times in a 2.5 hour period at a maximum temperature of 95° C. and a minimum temperature of −40° C.

The results revealed no separation between film and substrate, and no change in optical waveguide properties.

The deformation of the optical waveguide was measured at varying temperatures, revealing that the changes caused by thermal expansion were the same as those caused by thermal expansion in the glass.

EXAMPLES 2 THROUGH 6

Optical waveguide elements were manufactured in the same manner as in Example 1, except that the organosilane compounds given in Table 1 were used in the surface improving treatment of the glass substrates.

The results obtained in similar deformation measurement, heat cycle tests, and thermal expansion changes of the optical waveguide elements were as favorable as in Example 1.

TABLE 1

| Example | Type of silane coupling agent (aqueous solution concentration % during treatment) |
|---|---|
| 1 | 3-aminopropyltriethoxysilane (2%) |
| 2 | 3-aminopropyltrimethoxysilane (2%) |
| 3 | N-(2-aminoethyl)-3-aminopropyltrimethoxysilane (2%) |
| 4 | N-phenyl-3-aminopropyltrimethoxysilane (2%) |
| 5 | $CH_3=CH-C_6H_4-CH_2NH(HCl)(CH_2)_2NH(CH_2)_2Si(OCH_3)_3$ (2%) |
| 6 | 3-aminopropyltrimethoxysilane (1%) + 3-methacryloxypropyltrimethoxysilane (1%) |

Comparative Example 1

Manufacture of Polymer Optical Waveguide Film By Conventional Method

A solution obtained by dissolving a polycarbonate resin synthesized from bisphenol Z(trademark: IUPILON Z, mfg. by Mitsubishi Gas Chemical Company Inc.), methyl acrylate as photolymerizable monomer, and benzoin ethyl ether as a photopolymeration initiator was cast in a 15 cm by 15 cm by 15 cm casting vessel, and the solvent was carefully evaporated off.

The same bifurcated optical waveguide photomask as that in Example 1 was placed on the product, which was irradiated with ultraviolet rays by a common method to polymerize the methyl acrylate monomer in the exposed portions.

The resulting film was then peeled off, and the methyl acrylate monomer in the unexposed portions was vacuum dried away, resulting in a 40 $\mu$m thick polymer film consisting of a single polycarbonate phase in the unexposed portions and a mixed phase of polycarbonate and polymethyl acrylate in the exposed portions.

Measurement of the configuration of the resulting polymer film optical waveguide revealed that the intervals between the 10 cm wide marking were 3.1 mm and that the branched waveguide pitch was 8 $\mu$m, which were smaller than those of the photomask pattern, and that the film had shrunk about 3% as a result of drying.

EXAMPLE 7

Manufacture of Bifurcated Optical Waveguide Element Having 10 $\mu$m by 10 $\mu$m Square Cross Section A 10 $\mu$m thick optical waveguide element with the polymer film and glass substrate firmly adhering to each other was manufactured by roughly the same operations as in Example 1 using the same photomask as in Example 1, except that the optical waveguide width of the photomask pattern was 10 $\mu$m.

The results obtained in similar deformation measurement, heat cycle tests, and thermal expansion changes of the optical waveguide element were as favorable as in Example 1.

Comparative Example 2

Manufacture of Polymer Optical Waveguide Film By Conventional Method

A 10 $\mu$m thick polymer film having a bifurcated waveguide pattern was manufactured by the roughly the same operations as in Comparative Example 1 using the same photomask as in Example 7.

The resulting film was substantially warped in the form of a wrapped film and tended to wrinkle, making it extremely difficult to handle.

An attempt to have the film adhere to the glass substrate using an adhesive resulted in markedly wavy adhesion, with the intervals between the 10 cm markings smaller by 5 mm or more.

EXAMPLE 8

Manufacture of Microlens Array

A distributed index microlens array 50 $\mu$m in diameter was manufactured in a 200 $\mu$m thick polymer film by the same processes as in Example 1 on a 15 cm by 15 cm square and 1.5 mm thick glass substrate which had been surface treated under the same conditions as in Example 1.

The results obtained for deformation measurement, heat cycle tests, and thermal expansion changes in the same manner as in Example 1 were similarly favorable.

EXAMPLE 9

Figure 3:
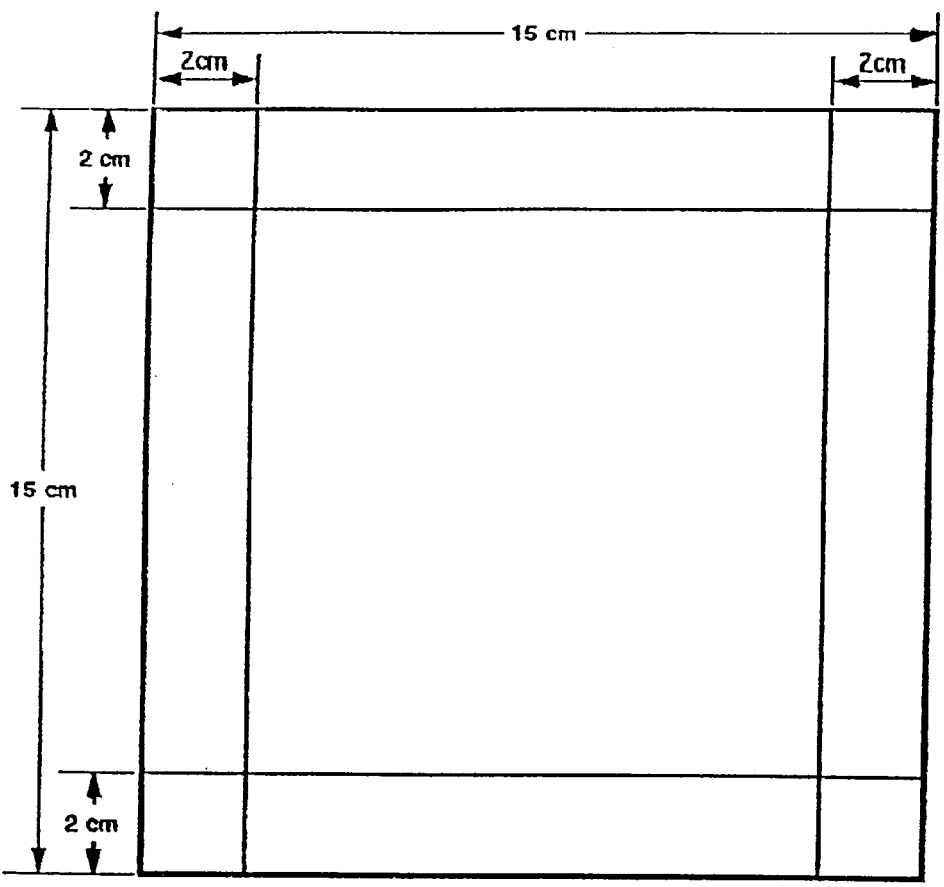
FIG. 3 is an illustration depicting the location of the groove processed on a glass substrate in Preferred Example 9.

Manufacture of Bifurcated Optical Waveguide Element Having 40 $\mu$m by 40 $\mu$m Square Cross Section A polymer film was prepared in the same manner as in Example 1 except that, as a treatment for preventing separation, the glass substrate was processed with a dicing machine to form a groove with a groove width of 0.5 mm and a depth of 0.7 mm at the location indicated by the straight line in FIG. 3 (straight line within 2 cm from end of substrate) on a 15 cm by 15 cm and 1.1 mm thick glass substrate.

The polymer film adhered firmly to the glass substrate within the area surrounded by the groove as a result of this process.

Another 15 cm by 15 cm and 1.1 mm glass substrate that was not processed to provide a groove was then allowed to adhere to the polymer film using an adhesive with a refractivity of 1.56, so as to prepare a structure in which glass substrates were held on both sides of the film. This was then cut to a size of 12 mm×4 mm to produce an optical waveguide element.

Before the product was cut into an optical waveguide element, the misregistration of the markings formed in the 10 cm by 10 cm square was measured. The branched waveguide pitch of the 12 mm×4 mm optical waveguide element thus manufactured was also measured.

The results revealed that the misregistration and pitch precision were both 1 $\mu$m or less.

The deformation of the optical waveguide was measured at varying temperatures, revealing that the changes caused by thermal expansion were the same as those caused by thermal expansion in the glass.

EXAMPLE 10

Manufacture of Bifurcated Optical Waveguide Element Having 10 $\mu$m by 10 $\mu$m Square Cross Section A 10 $\mu$m thick optical waveguide element with the polymer film and glass substrate firmly adhering to each other was manufactured by roughly the same operations as in Example 9 using the same photomask as in Example 1, except that the optical waveguide width of the photomask pattern was 10 $\mu$m.

The results obtained in similar deformation measurement and thermal expansion changes of the optical waveguide element were as favorable as in Example 1.

EXAMPLE 11

Manufacture of Microlens Array

A distributed index microlens array 50 $\mu$m in diameter was manufactured in a 200 $\mu$m thick polymer film by the same processes as in Example 9 on a 15 cm by 15 cm and 1.5 mm thick glass substrate which had been treated to provide a groove under the same conditions as in Example 9.

The results obtained for deformation measurement and thermal expansion changes in the same manner as in Example 9 were similarly favorable.

EXAMPLE 12

Manufacture of Bifurcated Optical Waveguide Element Having 40 $\mu$m by 40 $\mu$m Square Cross Section (using grooved glass substrates on both sides of elements)

The glass substrate in Example 9 was additionally processed to provide grooves with a width of 0.3 mm and a depth of 0.5 mm at locations corresponding to both sides of components in which elements were to be manufactured on glass substrates which had been processed to provide grooves in the same manner as in Example 9.

Figure 4:
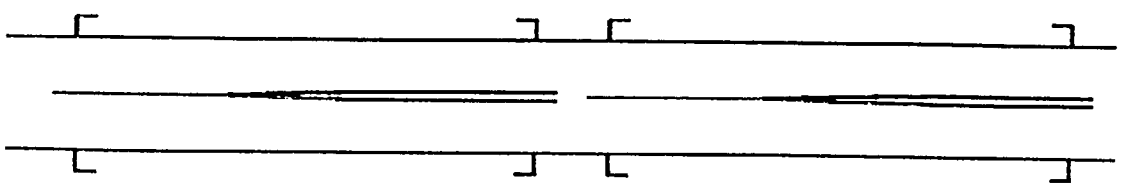
FIG. 4 is a partially enlarged plan matching the location of the groove processed on the glass substrate in Example 9 with the photomask pattern depicted in FIG. 1.

FIG. 4 is a partial enlargement matching the location of the grooves processed on this glass substrate with the photomask pattern depicted in FIG. 1.

This Example was done in the same manner as in Example 9 except for the use of this glass substrate. As a result of this processing step, the polymer film similarly adhered firmly to the glass substrate within the area where the elements were to be fashioned.

The results obtained in similar deformation measurement and thermal expansion changes of the optical waveguide element were as favorable as in Example 9.

EXAMPLE 13

Manufacture of Bifurcated Optical Waveguide Element Having a 40 μm by 40 μm Square Cross Section This Example was done in the same manner as in Example 9 except for the use of a casting vessel prepared using a glass substrate. The results obtained in similar deformation measurement and thermal expansion changes of the optical waveguide element were as favorable as in Example 9.

Figure 5:
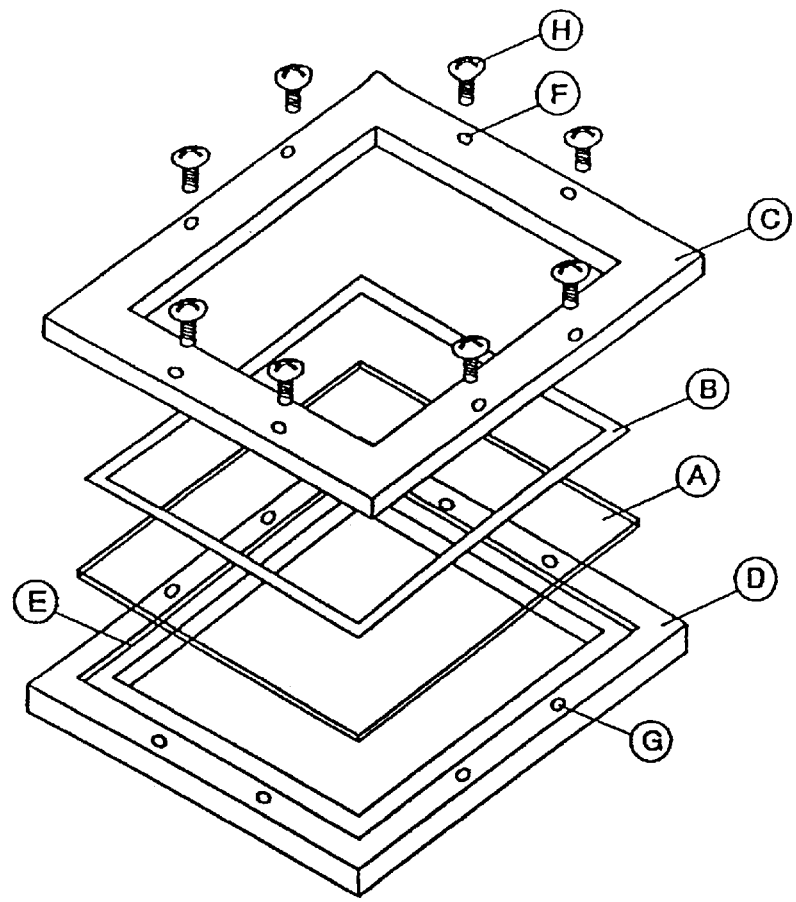
FIG. 5 is an oblique view depicting an example of a casting vessel constructed using a glass substrate.
Figure 6:
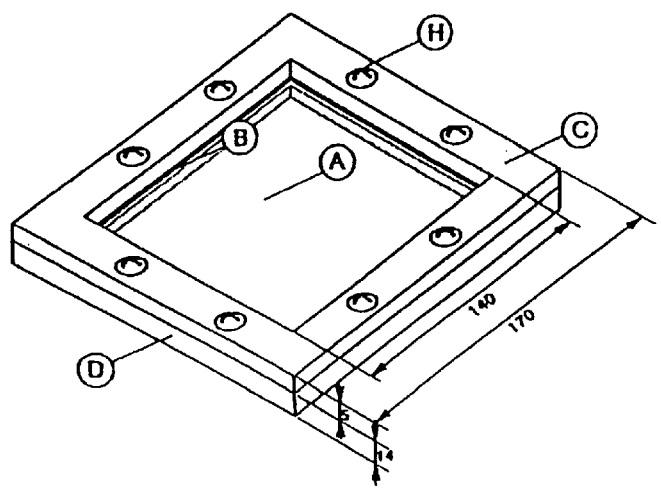
FIG. 6 is an oblique view of the casting vessel.

Here, the casting vessel was constructed as depicted in FIG. 5 using a 15 cm by 15 cm and 1.1 mm thick glass substrate. Paper packing material in the form of a frame was prepared using clean room dust-free paper (64 g/m$^2$ product), an aluminum frame and aluminum platform in the form of a frame were used, and these were placed on top of each other and screwed to prepare a vessel with the dimensions given in FIG. 6.

EXAMPLE 14

Manufacture of Bifurcated Optical Waveguide Element Having 10 μm by 10 μm Square Cross Section A 10 μm thick optical waveguide element was manufactured by roughly the same operations as in Example 1 using the same photomask as in Example 13, except that the optical waveguide width of the photomask pattern was 10 μm.

The results obtained in similar deformation measurement and thermal expansion changes of the optical waveguide element were as favorable as in Example 13.

EXAMPLE 15

Manufacture of Microlens Array

A distributed index microlens array 50 μm in diameter was manufactured in a 200 μm thick polymer film by the same processes as in Example 1 using the casting vessel as in Example 13 constructed of a glass substrate and the like.

The results obtained for deformation measurement and thermal expansion changes in the same manner as in Example 13 were similarly favorable. The extent of misregistration was no more than 1 μm per 10 cm.

The manufacturing method pertaining to the present invention allows a polymer film having a distributed index to be readily manufactured with high dimensional precision, and can be applied to large-scale or extremely thin films, which were considered a problem in the past in terms of dimensional precision and handling.

The present invention allows high precision optical elements to be manufactured at a low cost, and allows optical components obtained using inexpensive polymer film to be used in a wide variety of applications.

What is claimed is:

1. A method for manufacturing an optical element, comprising:

a first step, in which a transparent polymer film containing a photopolymerizable monomer is manufactured by solvent casting;

a second step, in which said transparent polymer film is selectively irradiated with ultraviolet rays to polymerize and fix the photopolymerizable monomer in the areas exposed to this light;

a third step, in which the polymer film obtained in said second step is separated and dried, and the unreacted photopolymerizable monomer is removed to form a distributed index polymer film;

a fourth step, in which said distributed index polymer film is allowed to adhere to a glass substrate; and a fifth step, in which subsequent processing is conducted, characterized in that said glass substrate (I) has a groove formed around the area in which an optical element is to be formed, said transparent polymer of said first step is manufactured on the glass substrate (I), and the exposure of said second step, the drying of said third step and the subsequent processing of said fifth step are conducted without separating the polymer film from the glass substrate (I).

2. A method for manufacturing an optical element according to claim 1, wherein said transparent polymer is a polycarbonate resin obtained from 1,1-bis(4-hydroxyphenyl)cyclohexanone as the starting material, and said photopolymerizable monomer is an acrylic acid ester-based monomer.

3. A method for manufacturing an optical element according to claim 1, wherein a surface of said glass substrate (I) is treated with an organosilane compound for improving the the affinity between the glass and the transparent polymer.

4. A method for manufacturing an optical element according to claim 3, wherein said organosilane compound is $Si(R^1)(OR^2)_3$ (where $R^1$ is an organic group having a vinyl bond or an amino group, and $R^2$ is a methyl or ethyl group).

5. A method for manufacturing an optical element according to claim 1, wherein said groove is within the following range:

0.2 mm ≦ W ≦ 1 mm, and 0.3 mm ≦ D ≦ 1 mm, where W is the groove width, and D is the groove depth.

6. A method for manufacturing an optical element, comprising:

a first step, in which a transparent polymer film containing a photopolymerizable monomer is manufactured by solvent casting, a second step, in which said transparent polymer film is selectively irradiated with ultraviolet rays to polymerize and fix the photopolymerizable monomer in the areas exposed to this light;

a third step, in which the polymer film obtained in said second step is dried, and the unreacted photopolymerizable monomer is removed to form a distributed index polymer film;

a fourth step, in which said distributed index polymer film is allowed to adhere to a glass substrate; and a fifth step, in which subsequent processing is conducted, characterized in that said transparent polymer film of said first step is manufactured in a casting vessel which is equipped with a glass substrate (A), a packing material (B) located on the edge of said glass substrate (A), and a frame (C) located on top of said packing material, and the exposure of said second step, the drying of said third step and the subsequent processing of said fifth step are conducted without separating the polymer film from the glass substrate (A).

7. A method for manufacturing an optical element as defined in claim 6, wherein said first packing material (B) is a cellulose-based material.

* * * * *